(12) United States Patent
Voyer et al.

(10) Patent No.: US 12,368,587 B2
(45) Date of Patent: Jul. 22, 2025

(54) METHOD TO PROVISION A SUBSCRIPTION IN A CONSTRAINED DEVICE

(71) Applicant: THALES DIS FRANCE SAS, Meudon (FR)

(72) Inventors: Jerome Voyer, Auriol (FR); Jean-François Gros, Marseilles (FR); Dominique Petyt, Auribeau sur Siagne (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/028,877

(22) PCT Filed: Sep. 21, 2021

(86) PCT No.: PCT/EP2021/075937
§ 371 (c)(1),
(2) Date: Mar. 28, 2023

(87) PCT Pub. No.: WO2022/069295
PCT Pub. Date: Apr. 7, 2022

(65) Prior Publication Data
US 2024/0364510 A1    Oct. 31, 2024

(30) Foreign Application Priority Data
Sep. 29, 2020    (EP) .................... 20315423

(51) Int. Cl.
*H04L 9/08* (2006.01)
*H04L 9/06* (2006.01)

(52) U.S. Cl.
CPC .......... *H04L 9/0894* (2013.01); *H04L 9/0618* (2013.01)

(58) Field of Classification Search
CPC .. H04L 9/0894; H04L 9/0618; H04W 12/069; H04W 12/35; H04W 12/06; H04W 8/205
See application file for complete search history.

(56) References Cited

U.S. PATENT DOCUMENTS 6,367,011 B1 * 4/2002 Lee .................. G06F 21/77
380/255
8,083,140 B1 * 12/2011 Katzer ................. G06Q 10/10
235/383

(Continued)

FOREIGN PATENT DOCUMENTS

| EP | 2704466 A1 | 3/2014 |
| EP | 3313111 A1 | 4/2018 |
| WO | 2016055640 A2 | 4/2016 |

OTHER PUBLICATIONS

International Search Report and Written Opinion mailed on Jan. 3, 2022 for corresponding International Application PCT/US2021/075937 (11 pages).

*Primary Examiner* — Mohammed Waliullah

(57) ABSTRACT

The disclosure proposes a method for switching from a first subscription of a first telecommunication network operator to a second subscription of a second telecommunication network operator on a plurality of smart cards, the method comprising, for each smart card pre-provisioning the smart card with a batch of secret keys at the level of a personalization factory; thanks to a first input file transmitted by the first telecommunication network operator to the personalization factory, generating at the personalization factory an output file comprising a first secret key selected in the batch, a corresponding first IMSI and a first ciphered operator code; transmitting the output file to the first telecommunication network operator; and transmitting OTA keys and the (Continued)

first IMSI to an OTA server of a service provider managing the smart card in order to attach the smart card to the first telecommunication network.

5 Claims, 1 Drawing Sheet

(56) References Cited

U.S. PATENT DOCUMENTS

| | | | |
|---|---|---|---|
| 9,277,395 B2* | 3/2016 | Aboulhosn | H04W 8/205 |
| 9,357,375 B2* | 5/2016 | Howard | H04W 8/18 |
| 2013/0151400 A1* | 6/2013 | Makhotin | G06Q 20/02 |
| | | | 705/39 |

* cited by examiner

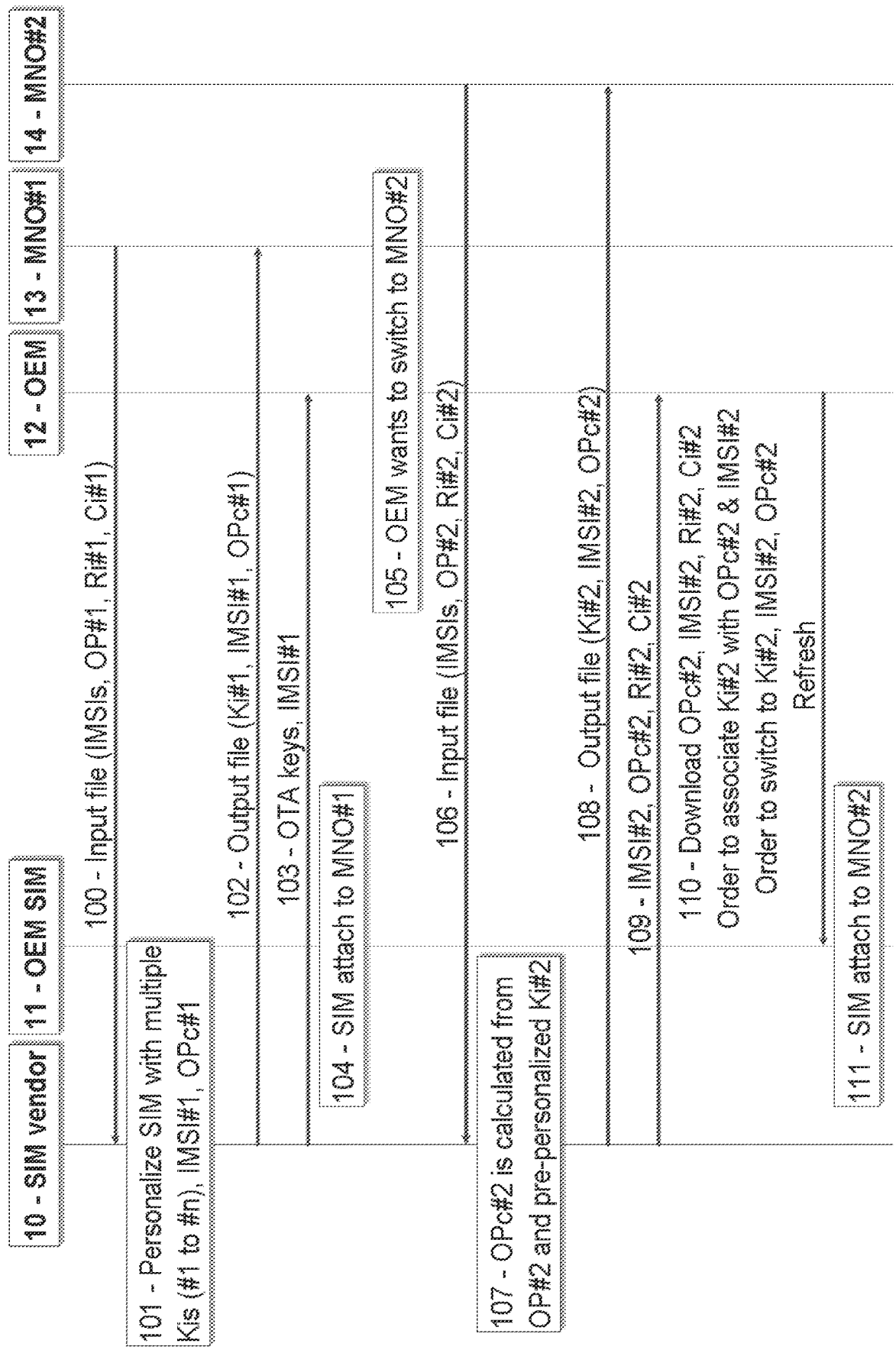

METHOD TO PROVISION A SUBSCRIPTION IN A CONSTRAINED DEVICE

FIELD OF USE

The present invention concerns telecommunication.

More precisely, the invention proposes a solution for downloading a subscription of a first network operator in a removable secure element like a smart card (Sim card or UICC—Universal Integrated Circuit Card) and to replace later on this first subscription by another subscription of a second network operator. Removable means that the smart card can be extracted from the device with which it cooperates. This should be possible for a plurality of secure elements.

The invention is applicable to many devices like smartphones, PDAs comprising smart cards but is more particularly interesting for IoT (Internet of Things), NB-IoT (Narrow Band IoT) and M2M (Machine to Machine) devices (constrained devices having limited bandwidth).

BACKGROUND

When it is desired for a smart card to switch from a first subscription of a first network operator to a second subscription of a second network operator, it is known to use RSP (Remote Sim Provisioning) as specified by the GSMA.

RSP allows the "over the air" provisioning of an initial operator subscription, and the subsequent change of subscription from one operator to another. However RSP employs a http link between a server and the eUICC (RSP is dedicated to embedded UICCs-eUICCs).

It is not dedicated to removable smart cards, in order, notably, to transmit to the smart card a secret key called Ki. This is a problem when the smart card cooperates with an IoT or NB-IoT device since such devices have a very limited bandwidth and/or a poor battery capacity. So, RSP is not adapted for IoT or NB-IoT devices.

In a smart card, there are two important secrets: The secret key Ki and another secret key OPc. OPc is a 128 bits ciphered operator code computed in the smart card, typically generated according to the Rjindael cipher algorithm:

$$OPc=AES128(Ki,OP) \text{ XOR } OP$$

(Ref.: https://www.etsi.org/deliver/etsi_ts/135200_135299/135206/09.00.00_60/ts_135206v090000p.pdf or https://nickvsnetworking.com/hss-uSim-authentication-in-lte-nr-4g-5g).

OP is an operator code identical for all the cards (or a batch of cards) managed by an operator (MNO-Mobile Network Operator). The key Ki is independent of the network operator but OPc is a derived secret pertaining to a MNO. OPc is used by the authentication core network of the MNO.

In the scope of the invention, smart cards are managed by a service provider, like for example a car manufacturer having installed smart cards in a fleet of his vehicles. This service provider has a contract with a first network operator. But if the service provider might want to switch from this first MNO to a second MNO, for example because this second MNO proposes better services, has a bigger geographical coverage or proposes lower costs of his subscriptions.

The problem is then to change the subscriptions in the smart cards that are in the field in a secure manner, in order that they can connect themselves to the network of this second MNO. The present invention proposes a solution for switching securely from a first subscription of a first network operator to a second subscription of a second network operator on a plurality of smart cards.

SUMMARY

This solution is reached thanks to a method for switching from a first subscription of a first telecommunication network operator to a second subscription of a second telecommunication network operator on a plurality of smart cards, the method comprising, for each smart card:

Pre-provisioning the smart card with a batch of secret keys at the level of a personalization factory;

Thanks to a first input file transmitted by the first telecommunication network operator to the personalization factory, generating at the personalization factory an output file comprising a first secret key selected in the batch, a corresponding first IMSI and a first ciphered operator code;

transmitting the output file to the first telecommunication network operator;

Transmitting OTA keys and the first IMSI to an OTA server of a service provider managing the smart card in order to attach the smart card to the first telecommunication network;

If the service provider wants to switch from the first subscription to the second subscription without changing the smart card:

Thanks to a second input file transmitted by the second telecommunication network operator to the personalization factory, transmitting to the second telecommunication network operator an output file comprising a second secret key selected in the batch of secret keys, a second ciphered operator code and a second IMSI;

Transmitting the second IMSI, the second ciphered operator code and a second couple of constants to the service provider;

Downloading over-the-air by the service provider to the smart card the ciphered operator code, the second couple of constant, the second IMSI, an order to associate the second secret key with the second ciphered operator code and the second IMSI, and order the smart card to switch to the second secret key, to the second IMSI and to the second ciphered operator code before making a Refresh, in order to attach the smart card to the network of the second telecommunication network operator.

The invention also concerns a smart card personalized with a batch of secret keys at the level of a personalization factory.

BRIEF DESCRIPTION OF THE DRAWINGS

The invention will be better understood by reading the following description of an implementation example of the invention in regard of the unique FIGURE (FIG. 1) that represents exchanges of messages between different entities.

DETAILED DESCRIPTION

In this FIGURE, the entities are:

A SIM vendor 10 having a personalization factory of secure elements;

A SIM 11 (called OEM SIM) personalized by the SIM vendor 10. This SIM 11 is personalized by the SIM vendor 10 (hereinafter called OEM SIM 11) and shipped to an OEM 12. The SIM is intended to cooperate with a telecommunication terminal like a NB-IoT device for example. It can be for example a transceiver installed in a vehicle of a car manufacturer, in gas meters, electricity counters, . . . ;

The OEM 12 that manages the OEM SIM 11 (the car manufacturer, the gas company or the electricity company, . . . ). The OEM 12 has his own OTA platform for communicating with the OEM SIMs that are personalized by the Sim vendor 10 or delegates this task to an external company that owns an OTA platform. This is done in order to be able to administrate its devices over the air (see consumption of gas or electricity, manage the position of a fleet of vehicles, communicate with these devices over-the-air, . . . );

A first MNO 13, noted MNO #1;

A second MNO 14, noted MNO #2.

Before a first step 100, the OEM 12 has signed an agreement with MNO #1 13 in order that this MNO #1 13 provides OTA keys and IMSIs to his OTA platform (or to an OTA platform pertaining to a partner). These OTA keys are used for securing (encrypt and/or sign) SMS sent by the OTA platform to the Sim cards he is managing.

At step 100, MNO #1 13 (after having signed an agreement with the Sim vendor 10) sends a standardized input file to the SIM vendor 10. An input file typically comprises a batch of IMSIs (it can be millions of IMSIs) to the SIM vendor 10, along with an operator code (that is normally unique), called OP #1, and two constants Ri #1 and Ci #1.

At step 101, in a normal operational mode called personalization, the SIM vendor 10 provisions each SIM to be sent to the OEM 12 with a unique Ki, a corresponding IMSI received by the MNO #1 and a first ciphered operator code OPc #1=AES128 (Ki #1, OP #1) XOR OP #1

Here, in the scope of the invention, each smart card is pre-provisioned with a batch of secret keys (Kis) at the level of the personalization factory 10. So, each SIM to be shipped to the OEM 12 contains a plurality of Kis. The result is that each SIM contains a plurality of Kis (#1 to #n), n being at least equal to 2, with his own IMSI (noted IMSI #1) and multiple OPcs (noted OPc #1), the OPc being derived from the Ki.

The number of Kis depends of the OEM's 12 needs. If the OEM is a vehicle manufacturer who intends his vehicles to be sold worldwide, he asks to the Sim vendor to prepare millions of credentials for the chip cards he has ordered. Otherwise, if the OEM is a national company having a limited number of potential clients (electricity company, gas, . . . ), he will order an order to personalize a limited number of IMSIs, for example only one million.

So, if we consider a single Sim card, this Sim card contains multiple Kis but just one being active for MNO #1 (Ki #1), a single IMSI (IMSI #1) for MNO #1 and a corresponding OPc (OPc #1). At step 102, the SIM vendor 10 sends an output file to the MNO #1 13 comprising, for a given SIM card considered, Ki #1, IMSI #1 and OPc #1. MNO #1 is then provisioned with the credentials necessary to communicate with the OEM SIM 11.

In reality, millions of Kis, IMSIs and OPc (Ki #1 to Ki #n, IMSI #1 to IMSI #n, OPc #1 to OPc #n are sent to MNO #1 but here we consider only the credentials for a single SIM (Ki #1, IMSI #1 and OPc #1).

At step 103, the SIM vendor 10 also sends to the OEM 12 OTA keys and IMSI #1 in order that its OTA platform (owned or delegated to another entity) can communicate with these SIMs through the network of MNO #1.

After step 103, the SIMs can be shipped to the OEM 12 and, once installed in a terminal, they can attach to MNO #1 (step 104).

At a later stage, at step 105, OEM 12 wants to change the MNO with which his SIMs communicate. He signs an agreement with another MNO (MNO #2 14).

MNO #2 then, as at step 100, sends an input file (step 108) to the Sim vendor 10. This input file comprises IMSIs, the operator code OP #2 of MNO #2 and two constants Ri #2 and Ci #2.

At step 107, the Sim vendor 10 computes for each Sim and OPc #2 (thanks to OP #2 and the corresponding Ki). For a given Sim, he computes OPc #2 from OP #2 and Ki #2. Ki #2 is already installed in the Sim that contains Ki #1 (step 101).

At step 108, the Sim vendor 10 sends an output file to MNO #2 comprising Ki #2, an IMSI #2 and OPc #2. MNO #2 can then provision his HLR with these parameters. Sim vendor 10 also sends to OEM 12 IMSI #2, OPc #2 Ri #2 and Ci #2 (step 109). There is no need to send OTA keys to OEM 12 (as at step 103) since OEM 12 has already these keys in his OTA platform (no change of OEM).

Then, at step 110, the OEM 12 downloads over-the-air to the smart card the ciphered operator code OPc #2, the couple of constants (Ri #2 and Ci #2), the second IMSI IMSI #2, an order to associate the second secret key Ki #2 with the second ciphered operator code OPc #2 and the second IMSI IMSI #2, and order the smart card to switch to the second secret key Ki #2, to the second IMSI IMSI #2 and to the second ciphered operator code OPc #2 before making a Refresh (Refresh is an order that permits the terminal with which the card cooperates) to use these new parameters)), in order to attach (step 111) the smart card to the network of the second telecommunication network operator MNO #2 14.

Steps 100 to 103 and 106 to 109 are executed over a secure channel, for example by sending ciphered messages through Internet. Only step 110 is executed over-the-air (Ki #2 that is a secret is already installed in the smart card).

When the second subscription is installed in the smart card, all parameters are over-written, except Ki #1 that can stay on the card.

The invention claimed is:

1. A method for switching from a first subscription of a first telecommunication network operator to a second subscription of a second telecommunication network operator on a plurality of smart cards, said method comprising, for each smart card:

Pre-provisioning said smart card with a batch of secret keys at the level of a personalization factory;

by way of a first input file transmitted by said first telecommunication network operator to said personalization factory, generating at said personalization factory an output file comprising a first secret key selected in said batch, a corresponding first International Mobile Subscriber Identity (IMSI) and a first ciphered operator code;

transmitting said output file to said first telecommunication network operator;

Transmitting Over The Air (OTA) keys and said first IMSI to an OTA server of a service provider managing said smart card in order to attach said smart card to said first telecommunication network;

If said service provider wants to switch from said first subscription to said second subscription without changing said smart card:

by way of a second input file transmitted by said second telecommunication network operator to said personalization factory, transmitting to said second telecommunication network operator an output file comprising a second secret key selected in said batch of secret keys, a second ciphered operator code and a second IMSI;

Transmitting said second IMSI, said second ciphered operator code and a second couple of constants to said service provider;

Downloading over-the-air by said service provider to said smart card said ciphered operator code, said second couple of constants, said second IMSI, an order to associate said second secret key with said second ciphered operator code and said second IMSI, and order said smart card to switch to said second secret key, to said second IMSI and to said second ciphered operator code before making a Refresh, In order to attach said smart card to the network of said second telecommunication network operator.

2. A method for switching from a first subscription of a first telecommunication network operator to a second subscription of a second telecommunication network operator on a plurality of smart cards, said method comprising, for each smart card:

Pre-provisioning said smart card with a batch of secret keys at the level of a personalization factory;

Transmitting a first input file by said first telecommunication network operator to said personalization factory, generating at said personalization factory an output file comprising a first secret key selected in said batch, a corresponding first International Mobile Subscriber Identity (IMSI), International Mobile Subscriber Identity, and a first ciphered operator code;

Transmitting said output file to said first telecommunication network operator; and Transmitting OTA keys, Over The Air, and said first IMSI to an Over The Air (OTA) server of a service provider managing said smart card in order to attach said smart card to said first telecommunication network.

3. The method of claim 2, further comprising:

If said service provider wants to switch from said first subscription to said second subscription without changing said smart card:

Transmitting a second input file transmitted by said second telecommunication network operator to said personalization factory, transmitting to said second telecommunication network operator an output file comprising a second secret key selected in said batch of secret keys, a second ciphered operator code and a second IMSI.

4. The method of claim 3, further comprising:

Transmitting said second IMSI (IMSI #2), said second ciphered operator code (OPc #2) and a second couple of constants (Ri #2, Ci #2) to said service provider.

5. The method of claim 4, further comprising:

Downloading over-the-air by said service provider to said smart card said ciphered operator code, said second couple of constants, said second IMSI, an order to associate said second secret key with said second ciphered operator code and said second IMSI, and order said smart card to switch to said second secret key, to said second IMSI and to said second ciphered operator code before making a Refresh, in order to attach said smart card to the network of said second telecommunication network operator.

* * * * *